H. M. F. LEIGHTY.
MILK CAN COVER LOCKING DEVICE.
APPLICATION FILED JUNE 26, 1909.

951,423.

Patented Mar. 8, 1910.

Witnesses.
W. A. Loftus.
A. G. Hague

Inventor.
H. M. F. Leighty.
by Orwig & Lane, Attys

UNITED STATES PATENT OFFICE.

HENRY M. F. LEIGHTY, OF DAWSON, IOWA.

MILK-CAN-COVER-LOCKING DEVICE.

951,423.                Specification of Letters Patent.         Patented Mar. 8, 1910.

Application filed June 26, 1909. Serial No. 504,512.

*To all whom it may concern:*

Be it known that I, HENRY M. F. LEIGHTY, a citizen of the United States, residing at Dawson, in the county of Dallas and State of Iowa, have invented a certain new and useful Milk-Can-Cover-Locking Device, of which the following is a specification.

The object of my invention is to provide a device of simple, durable, and inexpensive construction, that may be used in the nature of an attachment to be applied to the ordinary milk can cover of the class in which the bottom of the cover is approximately flush with the inclined shoulder at the top of the can and the handle of the cover is arranged in position below the top of the cover between the sides of the cover.

A further object is to provide a device of this kind that will not in any way interfere with the ordinary use of the cover and will not prevent the use of the ordinary cover handle in the ordinary way.

A further object is to provide a device of this kind to which an ordinary wire seal may be readily, quickly and easily applied in such a manner that it is not likely to be accidentally broken in the ordinary handling of the device.

My invention consists in the construction, arrangement, and combination of the various parts of the device, whereby the objects contemplated are attained, as hereinafter more fully set forth, pointed out in my claims, and illustrated in the accompanying drawings, in which—

Figure 1:
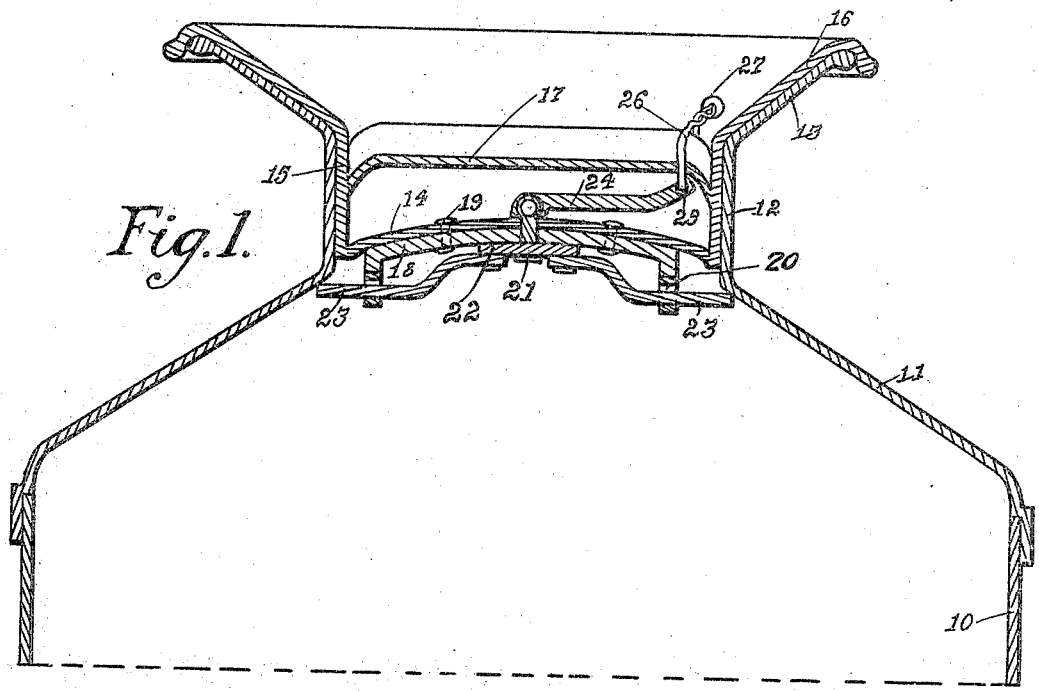
Figure 2:
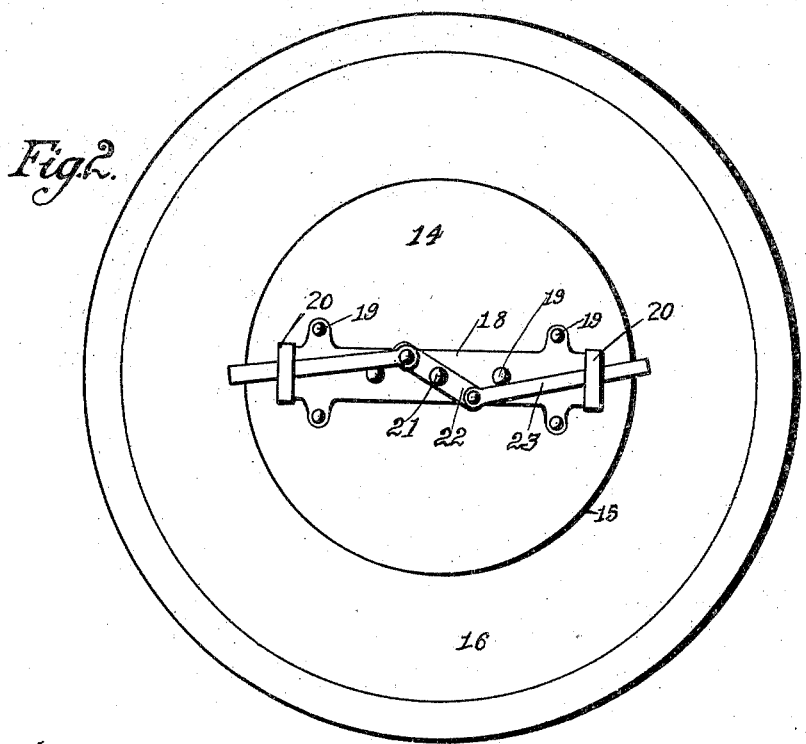

Figure 1 shows a vertical, central, sectional view of a part of a milk can cover with my improved device applied thereto in a locked and sealed position, and Fig. 2 shows an inverted plan view of the cover detached, having my improvement applied thereto.

Referring to the accompanying drawings, I have used the reference numeral 10 to indicate that portion of the milk can shown having an inclined shoulder 11, and also having a cylindrical neck 12 and an outwardly flared top 13.

The milk can cover which is of the ordinary construction comprises a disk shaped bottom piece 14, a cylindrical neck 15 to fit in the neck of the can, and an outwardly flared top portion 16 to overlap the part 13 of the can. It is also provided with a handle 17 extended from one side to the other of the cylindrical portion of the cover and spaced apart from the bottom of the cover and arranged wholly below the top of the cover. The construction of the cover and can does not form any part of my invention and is of the kind now in common use.

My invention is in the nature of an attachment that may be readily and easily applied to the covers now in common use. It comprises a supporting plate 18 connected by rivets 19 with the under surface of the bottom of the cover. It is provided at its ends with the downwardly projected lugs 20 having openings therein. Extended through the center of the plate 18 is a pin 21 having fixed to its lower end a lever 22, and pivoted to the ends of said levers are two arms 23 extended outwardly through the lugs 20. The said pin 21 is extended upwardly through an opening in the bottom of the cover, and attached to the upper end of said pin is a handle 24 which handle has an opening 25 at its upper end. Said handle is capable of swinging in a horizontal plane below the cover handle 17, and said parts are so arranged that when the handle 24 is in line with the handle 17, the arms 23 will be in their extended positions, and when the handle 24 is at right-angles to the handle 17, the arms 23 will be withdrawn toward the center of the cover. When said arms 23 are in their extended positions, they will project under and engage the shoulder of the milk can, as shown in Fig. 1, and when they are withdrawn, they will freely pass upwardly through the cylindrical neck 12 of the milk can. When it is desired to seal the cover in its closed and locked position, a wire 26 is extended through the opening 25 in the handle 24 and is passed around the handle 17 of the milk can cover, and a seal 27 is attached to the ends of said wire.

One of the desirable and important features of my invention is that the operating handle 24, when in its locked or sealed position, is under the stationary handle 17 and is protected and concealed thereby so that it can not be accidentally moved to position for breaking the seal and unlocking the cover, and, further, said handle is protected by the stationary handle against such shocks and jars as would tend to break it. A further advantage is that the entire device may be used in the nature of an attachment and can be readily and easily applied to milk can covers now in common use without any change whatever in the structure of the cover or its handle.

I claim as my invention.

1. The combination of a milk can having an inclined top portion, a substantially cylindrical neck, and an outwardly flared upper end, a milk can cover having a disk shaped bottom portion arranged to be adjacent to the shoulder of the milk can when the cover is in position in the can, and also having a substantially cylindrical neck, and an outwardly flared top portion, and a stationary handle extended from one side to the other of the said cylindrical portion, and a plate secured to the under surface of the cover and having downwardly projecting lugs at its ends provided with openings, a pin extended through the bottom of the cover and through said plate, a lever fixed to the lower end of the pin, arms pivoted to the lever and extended outwardly through the openings in said lugs, and a handle attached to the top of the pin and capable of lying beneath the stationary handle on the cover.

2. The combination of a milk can having an inclined top portion, a substantially cylindrical neck, and an outwardly flared upper end, a milk can cover having a disk shaped bottom portion arranged to be adjacent to the shoulder of the milk can when the cover is in position in the can, and also having a substantially cylindrical neck, and an outwardly flared top portion, and a stationary handle extended from one side to the other of the said cylindrical portion, and a plate secured to the under surface of the cover and having downwardly projecting lugs at its ends provided with openings, a pin extended through the bottom of the cover and through said plate, a lever fixed to the lower end of the pin, arms pivoted to the lever and extended outwardly through the openings in said lugs, and a handle attached to the top of the pin and capable of lying beneath the stationary handle on the cover, said handle being provided with an opening at its outer end, and a wire extended through said opening and around the stationary handle of the cover, and a seal connecting the ends of said wire, substantially as and for the purposes stated.

Des Moines, Iowa, June 12, 1909.

HENRY M. F. LEIGHTY.

Witnesses:
W. A. McCrory,
J. J. McCrory.